(12) United States Patent
Ding et al.

(10) Patent No.: US 10,159,230 B1
(45) Date of Patent: Dec. 25, 2018

(54) CONTINUOUS TRAWL FISHING METHOD

(71) Applicant: Zhejiang University of Technology, Hangzhou (CN)

(72) Inventors: Yuting Ding, Hangzhou (CN); Yanbo Wang, Hangzhou (CN); Chuang Sui, Hangzhou (CN); Xuxia Zhou, Hangzhou (CN); Shulai Liu, Hangzhou (CN); Hongliang Huang, Hangzhou (CN); Long Lin, Hangzhou (CN)

(73) Assignee: ZHEJIANG UNIVERSITY OF TECHNOLOGY, Hangzhou (CN)

(*) Notice: Subject to any disclaimer, the term of this patent is extended or adjusted under 35 U.S.C. 154(b) by 0 days.

(21) Appl. No.: 15/970,423

(22) Filed: May 3, 2018

(30) Foreign Application Priority Data

Dec. 21, 2017 (CN) .......................... 2017 1 1395283

(51) Int. Cl.
  *A01K 79/00* (2006.01)
  *A01K 73/04* (2006.01)
  *A01K 75/00* (2006.01)

(52) U.S. Cl.
  CPC .............. *A01K 79/00* (2013.01); *A01K 73/04* (2013.01); *A01K 75/00* (2013.01)

(58) Field of Classification Search
  CPC ........ A01K 73/02; A01K 73/04; A01K 73/06; A01K 73/10; A01K 75/00; A01K 79/00
  USPC .................................. 43/4.5, 6.5, 8, 9.1, 9.8
  See application file for complete search history.

(56) References Cited

U.S. PATENT DOCUMENTS

| | | | | |
|---|---|---|---|---|
| 1,447,553 | A * | 3/1923 | Hudson | A01K 73/00 43/6.5 |
| 3,314,184 | A * | 4/1967 | Lerch | A01K 79/00 43/14 |
| 3,440,752 | A * | 4/1969 | Minter | A01K 73/00 43/6.5 |
| 4,509,285 | A * | 4/1985 | Smith | A01K 73/00 43/17.1 |

(Continued)

FOREIGN PATENT DOCUMENTS

| | | | | |
|---|---|---|---|---|
| EP | 0467003 A1 * | 1/1992 | | A01K 79/00 |
| FR | 2735329 A1 * | 12/1996 | | A01K 79/00 |

(Continued)

OTHER PUBLICATIONS

English-language translation of WO 2008/125332 (Year: 2008).*
English-language translation of FR 2735329 (Year: 1996).*

*Primary Examiner* — Lisa L Tsang
(74) *Attorney, Agent, or Firm* — Perkins Coie LLP

(57) ABSTRACT

A continuous trawl fishing method includes: by dragging a fishing net in water through a vessel, carrying out trawling operation so that catches to be fished enter a cod-end of a fishing net tail; then tractioning and moving the cod-end so that a sucking fish tube of a vacuum sucking fish pump reaches into the cod-end; and a tube mouth of the sucking fish tube contacting the catches in the cod-end to run the vacuum sucking fish pump to suck the catches from the cod-end into the collection tank through the sucking fish tube, and the catches in the collection tank being then transferred and frozen or directly processed. The fished catches of the present invention are obviously improved in indicators such as the stiffness time and the number of the first-grade fresh fish and so on. The histamine content is obviously reduced and the catch quality is improved.

7 Claims, 3 Drawing Sheets

(56) References Cited

U.S. PATENT DOCUMENTS

| | | | | | |
|---|---|---|---|---|---|
| 5,517,785 | A | * | 5/1996 | Sawaf | A01K 73/02 43/9.1 |
| 6,112,699 | A | * | 9/2000 | Saxby | A01K 80/00 119/213 |
| 6,453,596 | B1 | * | 9/2002 | Marco | A01K 81/04 43/17.1 |
| 2006/0048436 | A1 | * | 3/2006 | Ernsten | A01K 73/02 43/6.5 |
| 2010/0139147 | A1 | * | 6/2010 | Rokke | A01K 79/00 43/4.5 |
| 2014/0230308 | A1 | * | 8/2014 | Skjold-Larsen | A01K 73/02 43/4.5 |

FOREIGN PATENT DOCUMENTS

| | | | | | |
|---|---|---|---|---|---|
| GB | 1225469 | A | * | 3/1971 | A01K 79/00 |
| JP | 57160825 | A | * | 10/1982 | B65G 53/30 |
| WO | WO-8202645 | A1 | * | 8/1982 | A01K 79/00 |
| WO | WO-8703552 | A1 | * | 6/1987 | A01K 73/06 |
| WO | WO-2008125332 | A2 | * | 10/2008 | A01K 73/02 |

* cited by examiner

By dragging a fishing net in water through a vessel, carrying out trawling operation so that catches to be fished enter a cod-end of a fishing net tail.

↓

Tracting and moving the cod-end of the fishing net so that a sucking fish tube of a vacuum sucking fish pump installed at the vessel reaches into the cod-end and contacts the catches in the cod-end, wherein the vacuum sucking fish pump has a collection tank.

↓

Running vacuum sucking fish pump to suck the catches from the cod-end into the collection tank through the sucking fish tube.

FIG. 5

CONTINUOUS TRAWL FISHING METHOD

CROSS-REFERENCE TO RELATED APPLICATIONS

This Non-provisional application claims priority under 35 U.S.C. § 119(a) on Patent Application No(s). 201711395283.4 filed in People's Republic of China on Dec. 21, 2017, the entire contents of which are hereby incorporated by reference.

BACKGROUND OF THE INVENTION

Field of the Invention

The present invention relates to a sea fishing operation field, and more particularly, to a continuous trawl fishing method. Adopting the continuous trawl fishing operation method can well control and greatly improve catch quality.

Description of the Related Art

In the recent 30 years, as the trawl fishing technology develops rapidly, Chinese offshore economic fish resources have declined sharply, and an offshore trawl is in a state of fishing juvenile fish and forage fish for a long time. Therefore, developing oceanic trawl fishing has become a new growth point for marine fishing industry. The oceanic trawl fishing operates at a high-seas fishery far from the coastline and fishes oceanic fish resources such as saury, horse mackerel, krill and so on. Oceanic trawl fishing has high requirements on fishing vessels. Fishing vessel configuration is relatively advanced and has a high degree of mechanization and automation. Fishing aid and navigation equipment are perfect, and endurance is relatively long. At the same time, oceanic vessel bodies are relatively long and wide, displacement can be up to 2000~5000 tons, and equipment such as freezing, refrigeration, aquatic product processing and comprehensive utilization is equipped. The oceanic vessel is also a large-scale freezing processing vessel.

In general, large-scale trawlers still use a conventional offshore single trawl method. Specifically, a fishing vessel drags a fishing net, opens wings horizontally by using an otter board, opens a net mouth vertically by using a ups and downs rope, and maintains a water level position of the fishing net by adjusting a warp length and fishing vessel trawling speed. When the operation is started, the fishing vessel moves forward slowly and releases the fishing net from a stern ramp. After the otter board enters water, the fishing vessel moves forward quickly and releases the warp gradually. And after the warp is released to a predetermined length, the fishing vessel moves forward dragging the net at a predetermined trawling direction and speed. The released length of the warp is generally 3 to 5 times of the water depth, the trawling speed is generally 3 to 5 knots, and the net is hauled once every 3 to 6 hours when trawling. When the net is hauled, the fishing vessel moves forward slowly, and the winch, otter board and fishing net are collected in turn. Finally, the cod-end is dragged from the stern ramp to the deck, and the cod-end is lifted by the tower crane to pull down the catches.

In the trawl fishing aspect, the most significant advantage of the oceanic trawl compared to the offshore trawl is that the fishing net in the offshore trawl is large, the trawl length can be up to 200-550 m, and the operation water is deep with the depth up to 1,000 m, which has a higher fishing efficiency. However, some problems still exist in the oceanic trawl. Firstly, the catches increase. A large number of catches in the cod-end accelerate death due to lack of oxygen. The death time of catches is advanced, and the catches especially the fish quality is reduced. Secondly, dead catches retain in the cod-end for a long time and are subject to squeezing, crashing, which leads to the damage of the catches, and the catches quality are reduced. Thirdly, as a total length of the warp, sweep line and fishing net is up to several kilometers, closing the net and placing the net need long time. Fourthly, the number of catches increases. The work intensity increases, more crews are needed, crew living space is crowded, and daily replenishment is expensive.

BRIEF SUMMARY OF THE INVENTION

An objective of the present invention is to provide a continuous trawl fishing method for solving problems in the prior art of fast death of the fished catches, low quality and longtime retaining of the fishing net in the cod-end and the problem of high personnel work intensity in the fishing operation.

To solve above-mentioned problems, the present invention provides a continuous trawl fishing method including the following steps:
a trawling step: by dragging a fishing net in water through a vessel, carrying out trawling operation so that catches to be fished enter a cod-end of a fishing net tail;
a tractioning step: tractioning and moving the cod-end of the fishing net so that a sucking fish tube of a vacuum sucking fish pump installed at the vessel reaches into the cod-end and contacts the catches in the cod-end, wherein the vacuum sucking fish pump has a collection tank; and
a sucking step: running the vacuum sucking fish pump to suck the catches from the cod-end into the collection tank through the sucking fish tube.

According to one embodiment of the present invention, in the trawling step, the fishing net may be dragged for 20 to 50 min at a trawling speed of 2 to 5 knots, then the trawling speed may be reduced to 0.5 to 1.5 knot.

According to one embodiment of the present invention, in the tractioning step, through two traction devices, the cod-end may be tractioned and moved to the sucking fish tube, wherein the traction device may include a winch, a traction rope, a first traction pulley and a second traction pulley. The winches of the two traction devices may be installed at the vessel, and the first traction pulleys of the two traction devices may be disposed at two sides of the sucking fish tube, respectively. The first traction pulley of one of the traction devices may be disposed at a top of the cod-end, and the second traction pulley of the other traction device may be disposed at a bottom of the cod-end. One end of the traction rope may be fixed at the first traction pulley, and the other end of the traction rope may sequentially bypass the second traction pulley and the first traction pulley and be connected with the winch.

According to one embodiment of the present invention, in the tractioning step, the two traction devices may be started simultaneously so that to traction and move the cod-end to the sucking fish tube, wherein moving distance of the cod-end may be 35 to 65% of a length of the fishing net.

According to one embodiment of the present invention, a distance between the first traction pulley and a tube mouth of the sucking fish tube may be 30 to 60 m.

According to one embodiment of the present invention, in the tractioning step, through a visual probe and a netsonde sensor, the sucking fish tube may be positioned in auxiliary so that the tube mouth of the sucking fish tube may contact the catches in the cod-end, wherein both the visual probe and the netsonde sensor may be disposed at the tube mouth of the sucking fish tube.

According to one embodiment of the present invention, the continuous trawl fishing method may include the following step:

a processing step: transferring the catches in the collection tank to an ice slurry cold water pool for cooling, and arranging and sending the catches after cooling to a freezer for freezing or may directly sending to a processing production line for processing.

According to one embodiment of the present invention, the continuous trawl fishing method may include the following step:

a returning step: after stopping running the vacuum sucking fish pump, starting the traction device to release the traction rope, and raising the trawling speed to 6 to 7 knots simultaneously making the cod-end away from the sucking fish tube, when the traction rope may be in a relaxed state, stopping the traction device and reducing the trawling speed to 2 to 5 knots.

According to one embodiment of the present invention, the trawling step, the tractioning step, the sucking step and the returning step may be circulated sequentially.

Compared with the prior art, the present technical solution has the following advantages:

By making the sucking fish tube of the vacuum sucking fish pump system reach into the fishing net, and then tractioning and moving the cod-end under water, the sucking fish tube reaches into the cod-end to contact the catches. The present invention can suck fresh catches from the cod-end to the collection tank continuously. In other words, by adopting the method of the present invention, fresh fished catches can be continuously transferred from the cod-end to the collection tank, so as to avoid excessive catches retaining in the cod-end which leads to the catch death due to lack of oxygen. In addition, transferring the catches in the cod-end in time can prevent catches from being squeezed and crashed, so as to improve the catch quality. Secondly, as the catches in the cod-end can be transferred in time, and the cod-end will not retain excess catches, operators therefore can continuously fish catches in water to achieve continuous trawl fishing operation without closing and placing the net frequently for fishing and removing catches in the cod-end, which reduces the work intensity of the operators, reduces time cost in closing and placing the net, and greatly improves work efficiency. Thirdly, by equipping the fishing net with two active traction ropes extra, the cod-end has the ability to move with respect to the net body (that is, a part of the fishing net apart from the cod-end) of the fishing net. In this way, not only the sucking fish tube reaching into everywhere of the cod-end to suck the catches is achieved, but also a length needed for the sucking fish tube is reduced, which saves a loading space of the vessel. All in all, the continuous trawl fishing method of the present invention has the advantages of high efficiency, time saving and high catch quality, and overcomes the shortcomings of the conventional large-scale trawl fishing vessel.

By dragging the fishing net for 20 to 50 min at the trawling speed of 2 to 5 knots, the present invention can allow the catches to be fished enter into the fishing net maximally. Then the trawling speed is reduced to 0.5 to 1.5 knot, so as to facilitate the sucking of the fished catches in the fishing net.

By adopting the visual probe and the netsonde sensor to position in auxiliary the sucking fish tube, and then cooperating to operate the winch, the present invention can find and suck the catches in the cod-end more accurately, which improves the efficiency of transferring the catches.

By transferring the catches in the collection tank to the ice slurry cold water pool for fast cooling, and arranging the catches after cooling and sending them to the freezer for freezing or directly sending them to the processing production line for processing, the present invention can freeze and process the fished catches in time, which can improve the catch quality compared with the prior art.

BRIEF DESCRIPTION OF THE DRAWINGS

FIG. 5 is a flow chart of the continuous trawl fishing method provided by the present invention.

DETAILED DESCRIPTION OF THE INVENTION

Figure 1:
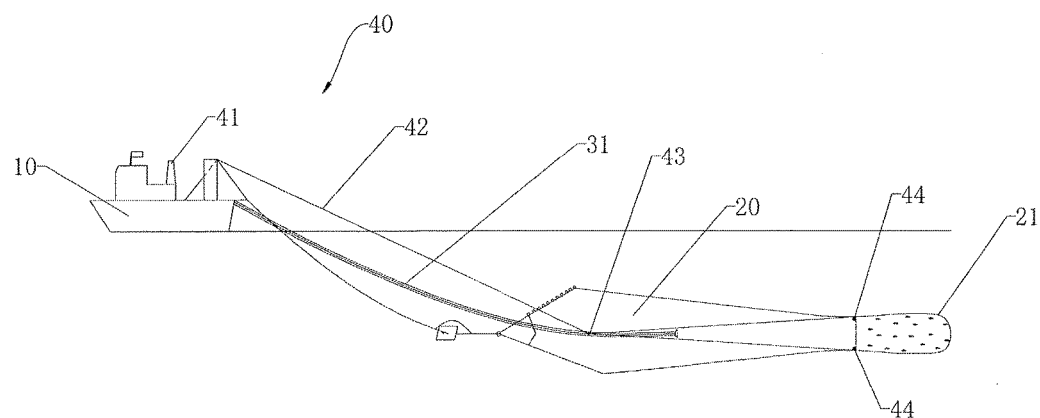
FIG. 1 is a side view of a state in which a vessel dragging a fishing net to carry out trawling operation in a continuous trawl fishing method provided by the present invention.
Figure 2:
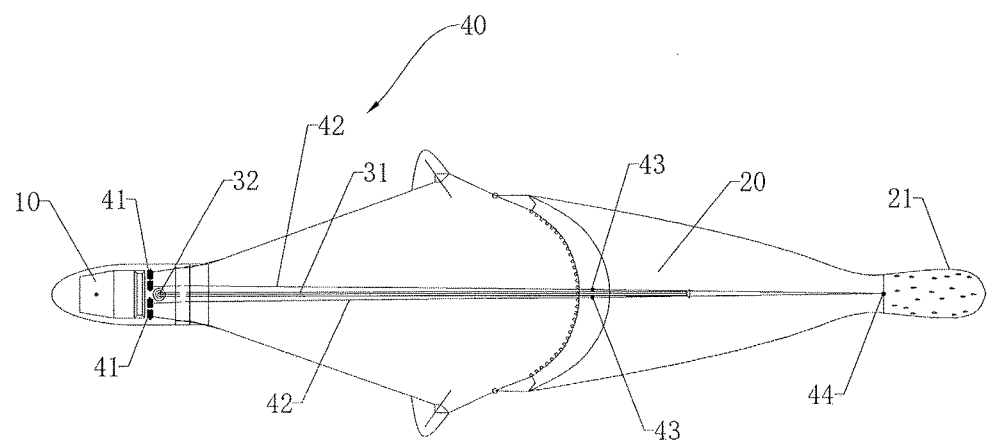
FIG. 2 is a vertical view of the state in which the vessel dragging the fishing net to carry out trawling operation in the continuous trawl fishing method provided by the present invention.
Figure 3:
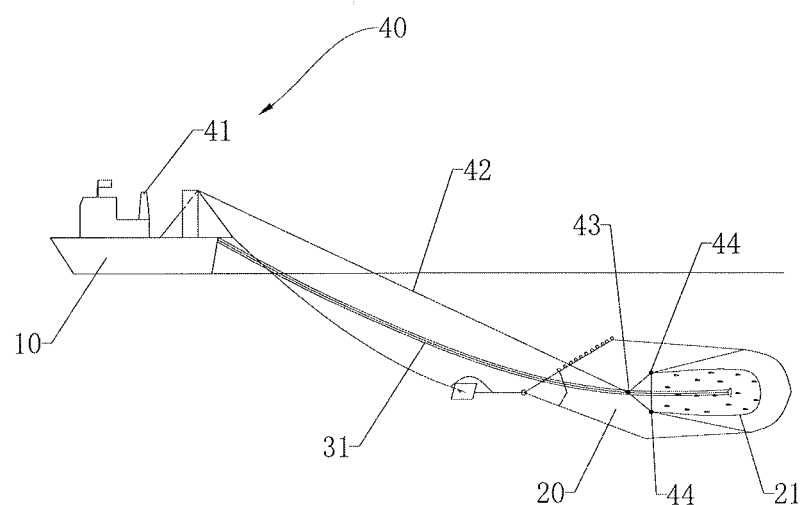
FIG. 3 is a side view of a state in which a sucking fish tube in a vacuum sucking fish pump system reaching into a fishing net to suck catches in the continuous trawl fishing method provided by the present invention.
Figure 4:
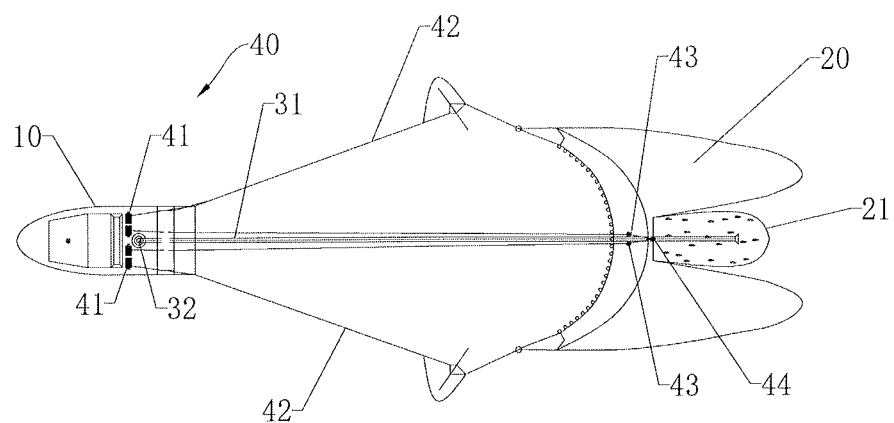
FIG. 4 is a vertical view of the state of the sucking fish tube in the vacuum sucking fish pump system reaching into the fishing net to suck catches in the continuous trawl fishing method provided by the present invention.

The following description is only for the purpose of providing the present invention so that those skilled in the present field will be able to practice the present invention. The following embodiments described are only for instance, and those skilled in the present field can think of other obvious variations. The basic principles of the present invention as defined in the following description may be applied to other embodiments, variations, modifications, equivalents, and other alternatives without departing from the spirit and scope of the invention.

The present invention provides a continuous trawl fishing method to fish the catches in the water and to carry out processing. Adopting the continuous trawl fishing method of the present invention, during the trawl fishing process, the fished catches in the fishing net can be transferred to the collection tank timely, so that a continuous fishing can be achieved. The continuous trawl fishing method includes the following steps:

a trawling step: by dragging a fishing net 20 in water through a vessel 10, carrying out trawling operation so that catches to be fished enter a cod-end 21 of a fishing net 20 tail;

a tractioning step: tractioning and moving the cod-end 21 of the fishing net 20 so that a sucking fish tube 31 of a vacuum sucking fish pump installed at the vessel 10 reaches into the cod-end 21 and contacts the catches in the cod-end 21, wherein the vacuum sucking fish pump has a collection tank 32; and a sucking step: running the vacuum sucking fish pump to suck the catches in the cod-end 21 into the collection tank 32 through the sucking fish tube 31.

Wherein, in the trawling step, by adopting conventional single vessel trawl method, the trawling operation can be carried out in the water. That is, the vessel 10 moves forward in the water and drags the fishing net 20 fixed at the vessel tail at a certain speed, the fishing net 20 is spread, and the catches in water to be fished will enter the fishing net 20 and retain at the cod-end 21 of the fishing net 20 tail.

Optionally, the size of the adopted fishing net 20 is 1440 m*361 m (228.6 m), that is, a net mouth perimeter of the fishing net 20 is 1440 m, a length of the fishing net 20 is 361 m, and both a length of an upper and a lower steel of the fishing net 20 are 228.6 m.

Optionally, the size of the adopted fishing net 20 is 1632 m*444 m (277.4 m), that is, the net mouth perimeter of the fishing net 20 is 1632 m, the length of the fishing net 20 is 444 m, and both the length of the upper and the lower steel of the fishing net 20 are 277.4 m.

Optionally, the size of the adopted fishing net 20 is 1040 m*253.02 m (149.4 m), that is, the net mouth perimeter of the fishing net 20 is 1040 m, the length of the fishing net 20 is 253.02 m, and both the length of the upper and the lower steel of the fishing net 20 are 149.4 m.

In the trawling step, the fishing net 20 is dragged for 20 to 50 min at a trawling speed of 2 to 5 knots, then the trawling speed is reduced to 0.5 to 1.5 knot. Specifically, during the fishing process, the fishing net 20 is dragged for 20 to 50 min at the trawling speed of 2 to 5 knots, so as to make as many as catches to be fished enter into the cod-end 21; and then the trawling speed is reduced to 0.5 to 1.5 knot to facilitate subsequent operations, that is, the catches are transferred to enter into the cod-end 21 to the collection tank 32.

In the tractioning step, before carrying out continuous trawl fishing operation, the vacuum sucking fish pump is pre-installed at the vessel 10. The sucking fish tube 31 of the vacuum sucking fish pump reaches from the vessel 10 to a middle front position of the fishing net 20 in water, and the collection tank 32 of the vacuum sucking fish pump is located at the vessel 10. Optionally, the power of the vacuum sucking fish pump is 500 t/h.

Further, in the tractioning step, through two traction devices 40, the cod-end 21 is tractioned and moved to the sucking fish tube 31, wherein the traction device 40 includes a winch 41, a traction rope 42, a first traction pulley 43 and a second traction pulley 44. The winches 41 of the two traction devices 40 are installed at the vessel 10, and the first traction pulleys 43 of the two traction devices 40 are disposed at two sides of the sucking fish tube 31, respectively. The distance between the first traction pulley 43 and the tube mouth of the sucking fish tube 31 is 30 to 60 m. The second traction pulley 44 of one of the traction devices 40 is disposed at a top of the cod-end 21, and the second traction pulley 44 of the other traction device 40 is disposed at a bottom of the cod-end 21. The installation positions of the second traction pulleys 44 are at a distance of 40 m from the end of the cod-end 21. One end of the traction rope 42 is fixed at the first traction pulley 43, and the other end of the traction rope 42 is sequentially bypass the second traction pulley 44 and the first traction pulley 43 and is connected with the winch 41. In this way, the two traction devices 40 traction the top and the bottom of the cod-end 21 through the traction rope 42, respectively, so that to move the cod-end 21 to the tube mouth position of the sucking fish tube 31.

Further, in the tractioning step, the winches 41 of the two traction devices 40 are started simultaneously to traction and move the cod-end 21 to the sucking fish tube 31, wherein a moving distance of the cod-end 21 is 35 to 65% of a length of the fishing net 20.

Furthermore, in the tractioning step, through a visual probe and a netsonde sensor, the sucking fish tube 31 is positioned in auxiliary so that the tube mouth of the sucking fish tube 31 contacts the catches in the cod-end 21, wherein both the visual probe and the netsonde sensor are disposed at the tube mouth of the sucking fish tube 31. In practical applications, before carrying out continuous trawl fishing operation, both the visual probe and the netsonde sensor are pre-installed at the tube mouth of the sucking fish tube 31 of the vacuum sucking fish pump. The visual probe and the netsonde sensor can precisely position the location of the sucking fish tube 31 at the fishing net 20 and feed back to the user, so that the user adjusts the tube mouth position of the sucking fish tube 31 according to real-time probe of the visual probe and real-time sensing information of the netsonde sensor to contact the catches in the cod-end 21 more precisely.

In the sucking step, after running the vacuum sucking fish pump, the vacuum sucking fish pump sucks the catches from the cod-end 21 to the collection tank 32 of the vacuum sucking fish pump through the sucking fish tube 31. The collection tank 32 is located at the vessel 10. By the method of the present invention, the catches can be transferred from the cod-end 21 to the vessel 10, which avoids excessive catches retained in the cod-end 21.

It can be understood that in the solution of the present invention, the catches are sucked to the collection tank 32 on the vessel 10 through the sucking fish tube 31 of the vacuum sucking fish pump. Therefore operators on the vessel transfer the catches in the cod-end 21 without suspending trawling, and the vessel 10 can continue to travel forward to trawl fishing at the same time. That is, operators can trawl while transferring the fished catches in the cod-end 21 without stopping to transfer the catches in cod-end 21, which achieves continuous trawl fishing and a higher fishing efficiency. Secondly, as the catches in the cod-end 21 can be transferred in time and will not retain for a long time, excessive catches squeezing to each other leading to damage and hypoxia death is avoided, the catch quality is improved, and the catch freshness is ensured. Thirdly, by transferring the catches through the vacuum sucking fish pump, the present invention does not need to manually close and place the net to transfer the catches. In this way, manpower is saved and work intensity of the operators on the vessel is reduced. In addition, time for transferring the catches by closing and placing the net is saved, and 1 to 2 days without hauling the net is achieved, time for hauling the net is greatly saved, and the fishing efficiency is higher.

Furthermore, the continuous trawl fishing method includes the following steps:

a processing step: transferring the catches in the collection tank 32 to an ice slurry cold water pool for cooling, and arranging and sending the catches after cooling to a freezer for freezing or directly sending to a processing production line for processing.

Optionally, the processing and the sucking step are carried out simultaneously, that is, in the application, the catches in the cod-end 21 can be sucked into the collecting tank 32 while the catches sucked in the collection tank 32 are transferred to the ice slurry cold water pool for fast cooling and are sent to the freezer for freezing or sent to the processing production line for processing. The existing large-scale fishing vessel is generally equipped with equipment such as freezing, refrigeration, aquatic product processing, comprehensive utilization and so on, and is also a large-scale freezing processing vessel. Therefore, catches fished and sucked into the collection tank 32 can be frozen for processing on the vessel 10, which can minimize the retaining time of the catches, maximize the catch freshness and enhance the catch quality. In conclusion, in the solution of the present invention, the three steps of fishing the catches from water, transferring the catches from the cod-end 21 to the vessel 10, and freezing the catches for processing can be continuously carried out.

Furthermore, the continuous trawl fishing method includes the following step:

a returning step: after stopping the vacuum sucking fish pump, starting the traction device 40 to release the traction rope 42, and raising the trawling speed to 6 to 7 knots simultaneously to make the cod-end 21 away from the sucking fish tube 31, when the traction rope 42 is in a relaxed state, stopping the traction device 40 and reducing the trawling speed to 2 to 5 knots.

Specifically, when the transferring of the catches in the cod-end 21 is completed, the vacuum sucking fish pump is stopped. At this time, the cod-end 21 is located at the sucking fish tube 31 position. Then the winch 41 is run to begin releasing the traction rope 42, and the trawling speed of the vessel 10 is raised to 6 to 7 knot, and the vessel 10 moves forward quickly, and the cod-end 21 will be separated from the sucking fish tube 31 gradually. After the traction rope 42 is fully in the relaxed state, the winch 41 is stopped, and the cod-end 21 returns to an original position, that is, the cod-end 21 is spread at the fishing net 20 tail.

The trawling step, the tractioning step, the sucking step and the returning step are circulated sequentially. By adopting this continuous trawl fishing method, time for hauling the net is saved, the catches in the cod-end 21 can be timely and quickly transferred to the collection tank 32, and further transferred to the ice slurry cold seawater pool. The quality of the catches is obviously improved.

Embodiment 1

A. Use a 1440 m*361 m (228.6 m) fishing net 20 to fish a horse mackerel. Carry out trawling operation so that catches to be fished enter a cod-end 21 of a fishing net 20 tail by dragging the fishing net 20 in water through a vessel 10. During the trawling operation, drag the fishing net for 20 min at a trawling speed of 2 to 3 knots, then reduce the trawling speed to 0.5 to 1 knot.

B. Start the winches 41 of the two traction devices 40 simultaneously to traction the traction rope 42, traction and move the cod-end 21 of the fishing net 20 forward so that a sucking fish tube 31 of a vacuum sucking fish pump installed at the vessel 10 reaches into the cod-end 21 and contacts the catches in the cod-end 21, and a forward distance of the cod-end 21 is 180 m.

At the same time, position in auxiliary the sucking fish tube 31 through a visual probe and a netsonde sensor and cooperate to control the winch 41 to contract or release the traction rope 42, so that the tube mouth of the sucking fish tube 31 contacts the catches in the cod-end 21.

C. Run the vacuum sucking fish pump to suck the catches in the cod-end 21 into the collection tank 32 through the sucking fish tube 31, and power of the vacuum sucking fish pump is 500 t/h.

D. Transfer the catches in the collection tank 32 into an ice slurry cold water pool for cooling, and arrange the catches after cooling and send them to a freezer for freezing or directly send them to a processing production line for processing.

E. After completely transferring the catches in the cod-end 21, stop running the vacuum sucking fish pump. Start running the traction device 40 to release the traction rope 42, and raise the trawling speed to 6 knots simultaneously to make the cod-end 21 away from the sucking fish tube 31. When the traction rope 42 is in a relaxed state, stop running the traction device 40 and reduce the trawling speed to 2 to 3 knots. At this moment, the vessel 10 returns to the trawling operation state, and return to step A to circulate again. Haul the net after 48 h, arrange the fishing net, and wait for the next placing the net.

A histamine value of the fished horse mackerel decreases from original 8 to 15 mg/100 g to 2 to 3 mg/100 g, a proportion of first-grade fresh fish (a content of total Volatile Base Nitrogen is less than 15 mg/100 g) increases from original 80% to 100%, and average time for fish body stiffness increases from 3-6 h to 4-10 h.

Embodiment 2

A. Use a 1632 m*444 m (277.4 m) fishing net 20 to fish a horse mackerel. Carry out trawling operation so that catches to be fished enter a cod-end 21 of a fishing net 20 tail by dragging the fishing net 20 in water through a vessel 10. During the trawling operation, drag the fishing net for 30 min at a trawling speed of 2.5 to 3 knots, then reduce the trawling speed to 1 knot.

B. Start the winches 41 of the two traction devices 40 simultaneously to traction the traction rope 42, traction and move the cod-end 21 of the fishing net 20 forward such that a sucking fish tube 31 of a vacuum sucking fish pump installed at the vessel 10 reaches into the cod-end 21 and contacts the catches in the cod-end 21, and a forward distance of the cod-end 21 is 230 m.

At the same time, position in auxiliary the sucking fish tube 31 through a visual probe and a netsonde sensor and cooperate to control the winch 41 to contract or release the traction rope 42, so that the tube mouth of the sucking fish tube 31 contacts the catches in the cod-end 21.

C. Run the vacuum sucking fish pump to suck the catches in the cod-end 21 into the collection tank 32 through the sucking fish tube 31, and power of the vacuum sucking fish pump is 500 t/h.

D. Transfer the catches in the collection tank 32 into an ice slurry cold water pool for cooling, and arrange the catches after cooling and send them to a freezer for freezing or directly send them to a processing production line for processing.

E. After completely transferring the catches in the cod-end 21, stop running the vacuum sucking fish pump. Start running the traction device 40 to release the traction rope 42, and raise the trawling speed to 7 knots simultaneously to make the cod-end 21 away from the sucking fish tube 31. When the traction rope 42 is in a relaxed state, stop running the traction device 40 and reduce the trawling speed to 3 to 5 knots. At this moment, the vessel 10 returns to the trawling operation state, and return to step A to circulate again. Haul the net after 36 h, arrange the fishing net, and wait for the next placing the net.

A histamine value of the fished horse mackerel decreases from original 8 to 15 mg/100 g to 3 to 4 mg/100 g, a proportion of first-grade fresh fish (a content of total Volatile Base Nitrogen is less than 15 mg/100 g) increases from original 80% to 100%, and average time for fish body stiffness increases from 3-6 h to 3-10 h.

Embodiment 3

A. Use a 1040 m*253.02 m (149.4 m) fishing net 20 to fish a horse mackerel. Carry out trawling operation so that catches to be fished enter a cod-end 21 of a fishing net 20 tail by dragging the fishing net 20 in water through a vessel 10.

During the trawling operation, first drag the fishing net for 50 min at a trawling speed of 3 to 5 knots, then reduce the trawling speed to 1 to 1.5 knot.

B. Start the winches 41 of the two traction devices 40 simultaneously to traction the traction rope 42, traction and move the cod-end 21 of the fishing net 20 forward such that a sucking fish tube 31 of a vacuum sucking fish pump installed at the vessel 10 reaches into the cod-end 21 and contacts the catches in the cod-end 21, and a forward distance of the cod-end 21 is 130 m.

At the same time, position in auxiliary the sucking fish tube 31 through a visual probe and a netsonde sensor and cooperate to control the winch 41 to contract or release the traction rope 42, so that the tube mouth of the sucking fish tube 31 contacts the catches in the cod-end 21.

C. Run the vacuum sucking fish pump to suck the catches in the cod-end 21 into the collection tank 32 through the sucking fish tube 31.

D. Transfer the catches in the collection tank 32 into an ice slurry cold water pool for fast cooling, and arrange the catches after cooling and send them to a freezer for freezing or directly send them to a processing production line for processing.

E. After completely transferring the catches in the cod-end 21, stop running the vacuum sucking fish pump. Start running the traction device 40 to release the traction rope 42, and raise the trawling speed to 7 knots simultaneously to make the cod-end 21 away from the sucking fish tube 31. When the traction rope 42 is in a relaxed state, stop running the traction device 40 and reduce the trawling speed to 2.5 to 3 knots. At this moment, the vessel 10 returns to the trawling operation state, and return to step A to circulate again. Haul the net after 36 h, arrange the fishing net, and wait for the next placing the net.

A histamine value of the fished horse mackerel decreases from original 8 to 15 mg/100 g to 4 to 5 mg/100 g, a proportion of first-grade fresh fish (a content of total Volatile Base Nitrogen is less than 15 mg/100 g) increases from original 80% to 100%, and average time for fish body stiffness increases from 3-6 h to 4-10 h.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A continuous trawl fishing method comprising the following steps:
   a trawling step: by dragging a fishing net in water through use of a vessel, carrying out a trawling operation so that catches to be fished enter a cod-end of the fishing net;
   a tractioning step: tractioning and moving the cod-end of the fishing net so that a sucking fish tube of a vacuum sucking fish pump installed at the vessel reaches into the cod-end and contacts the catches in the cod-end, wherein the vacuum sucking fish pump has a collection tank, and through a first traction device and a second traction device, tractioning and moving the cod-end to the sucking fish tube, wherein each of the first and the second traction devices comprises a winch, a traction rope, a first traction pulley and a second traction pulley, the winches of the first and the second traction devices are installed at the vessel, and the first traction pulleys of the first and the second traction devices are disposed at two sides of the sucking fish tube, respectively, wherein the second traction pulley of the first traction device is disposed at a top of the cod-end, the second traction pulley of the second traction device is disposed at a bottom of the cod-end, one end of the traction rope of the first traction device is fixed at the first traction pulley of the first traction device and an opposite end of the traction rope of the first traction device is connected with the winch of the first traction device, and one end of the traction rope of the second traction device is fixed at the first traction pulley of the second traction device and an opposite end of the traction rope of the second traction device is connected with the winch of the second traction device;
   a sucking step: running the vacuum sucking fish pump to suck the catches from the cod-end into the collection tank through the sucking fish tube;
   a returning step: after stopping running the vacuum sucking fish pump, starting the first traction device and the second traction device to release the traction rope, and raising the trawling speed to 6 to 7 knots simultaneously to make the cod-end travel away from the sucking fish tube at the same time, and stopping the traction device and reducing the trawling speed to 2 to 5 knots when the traction rope is in a relaxed state.

2. The continuous trawl fishing method according to claim 1, further comprising in the trawling step, dragging the fishing net for 20 to 50 minutes at a trawling speed of 2 to 5 knots, and then reducing the trawling speed to 0.5 to 1.5 knots.

3. The continuous trawl fishing method according to claim 1, further comprising in the tractioning step, starting the two traction devices simultaneously to tract and move the cod-end to the sucking fish tube, wherein a moving distance of the cod-end is 35 to 65% of a length of the fishing net.

4. The continuous trawl fishing method according to claim 1, wherein a distance between the first traction pulley of each of the first traction device and the second traction device and a tube mouth of the sucking fish tube is 30 to 60 meters.

5. The continuous trawl fishing method according to claim 1, further comprising in the tractioning step, positioning in auxiliary the sucking fish tube with a visual probe and a netsonde sensor so that a tube mouth of the sucking fish tube contacts the catches in the cod-end, wherein both the visual probe and the netsonde sensor are disposed at the tube mouth of the sucking fish tube.

6. The continuous trawl fishing method according to claim 1, the continuous trawl fishing method comprising the following step:
   a processing step: transferring the catches in the collection tank to an ice slurry cold water pool for cooling, and arranging and sending the catches after cooling to a freezer for freezing or sending the catches to a processing production line for direct processing.

7. The continuous trawl fishing method according to claim 1, wherein the trawling step, the tractioning step, the sucking step and the returning step are circulated sequentially.

* * * * *